Nov. 19, 1935. W. A. COOMBS 2,021,590
VALVE GEAR FOR AXIAL OR FOR RADIAL ENGINES
Filed Nov. 12, 1934 2 Sheets-Sheet 2
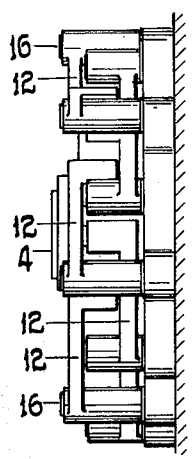
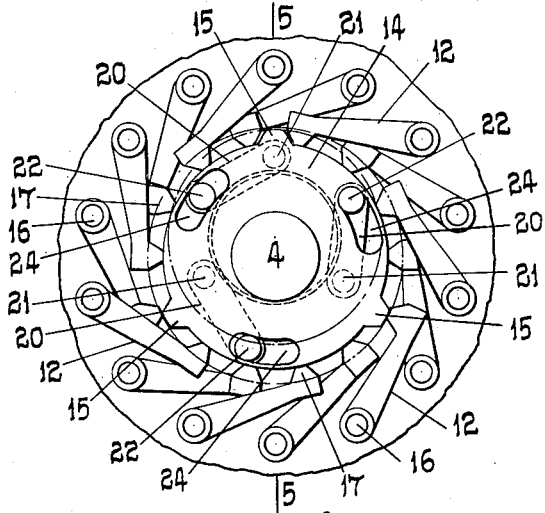
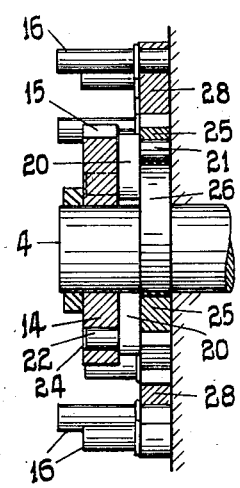
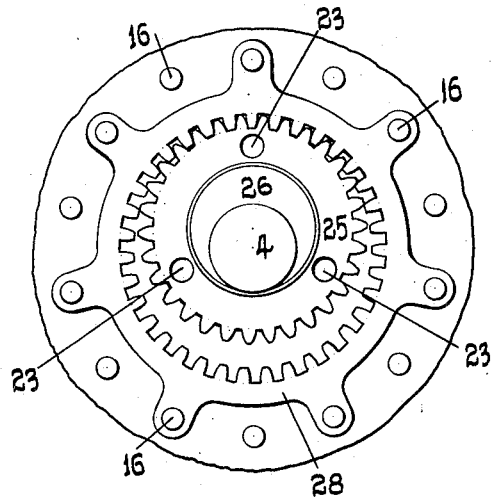
William Augustus Coombs
INVENTOR Patented Nov. 19, 1935

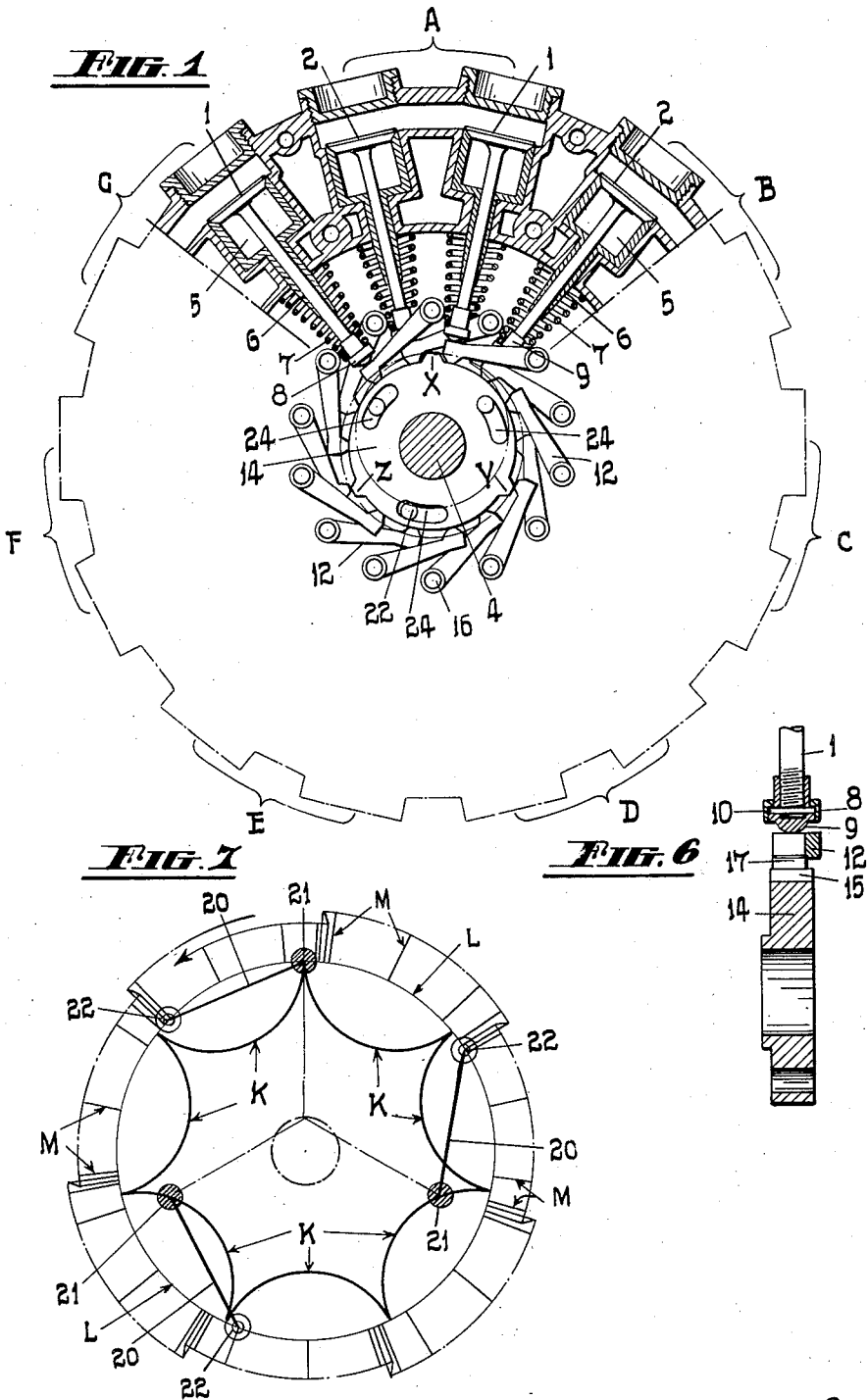

2,021,590

UNITED STATES PATENT OFFICE 2,021,590

VALVE GEAR FOR AXIAL OR FOR RADIAL ENGINES

William Augustus Coombs, Prospect, South Australia, Australia

Application November 12, 1934, Serial No. 752,680
In Australia March 15, 1934

3 Claims. (Cl. 123—90)

This invention relates to an improved valve gear for four-stroke engines having their cylinders arranged parallel or radial about the axis of the engine crank shaft and it has as its object an improved gear for driving the cam of such engines and also an improved arrangement of the valves or push rods.

According to my invention the cam is driven by an epicyclic gear comprising a fixed toothed ring co-axial with the crank shaft and a planet wheel carried upon an eccentric on the crank shaft, the planet wheel engaging the ring and being connected to the cam by links. The links are longer than the radius of the eccentric and engage in slots on the cam so that they move the cam by a succession of impulses. The cam is arranged to operate both the intake and exhaust valves of each cylinder from lobes in the same plane.

In order that my invention may be the more clearly understood however, I will now describe it with reference to the accompanying drawings in which I have shown my invention applied to the head of a seven cylinder engine of the type having its cylinders arranged parallel or radial about the axis of the crank shaft in which the valves themselves are arranged radially and in which arrangement no push rods are used, the valve stems engaging tappets.

In these drawings Figure 1 is a sectional end elevation of the cylinder head showing four valves only.

Figure 2 is an enlarged view of the cam and tappets.

Figure 3 is a side view of Fig. 2.

Figure 4 is an end elevation of the gear which drives the cam.

Figure 5 is a central sectional view of Fig. 2 on line 5—5 thereof but omitting the tappets.

Figure 6 is a central section of the cam and one of the valve stems.

Figure 7 is an enlarged diagram showing the paths followed by the two ends of the links which interconnect the cam and the planet wheel and indicating the distance of travel for equal units of time of those ends of the links which engage the cam.

The exhaust valves 1 and the intake valves 2 are of the usual mushroom type and are arranged alternately in a single plane at right angles to the axis of the crank shaft 4 and are positioned to have their stems radial about the axis of the crank shaft and to have their heads outward. The valves operate upon seatings in ports 5 in the cylinder heads and such ports are of usual or approved construction. The stems are slidable in guides 6 and each valve head is normally held down on to its seating by a spring 7 encircling its guide and stem and confined between the guide and a washer 8 upon the inner end of the stem. For valve adjustment the inner end of each of the stems is provided with a cap 9 adjustable lengthwise upon the stem, preferably by screw threads, and adapted to be locked in place, preferably by a pin 10 passing through the cap 9 and the stem and held in place by the washer 8 which has down-turned edges, the washer fitting over the cap 9 and being held in place by having the beforementioned spring 7 bearing thereon.

The caps 9 upon the inner ends of the stems of the valves 2 and 3 are engaged by tappets 12 (one to each) which in turn engage a cam 14 upon which are operating lobes 15.

Each tappet 12 is pivoted at the one end to a pin 16 upon the cylinder head or crank case and has one side of its free end in engagement with the cap 9 upon the valve stem and has the other side of its free end in engagement with the cam 14. The latter side has an appropriately shaped bearing face 17 or it may have a roller. The pins 16 upon which the tappets 12 are pivoted are arranged in a circle concentric with the crank shaft 4, and the pivoted ends of the tappets 12 are shaped to allow the free end of the next tappet to operate through it.

The cam 14 is rotatably mounted upon the crank shaft 4 and is co-axial therewith. It is in the same plane as the valves 1 and 2 and is connected by links 20 to a planet wheel 25 mounted upon an eccentric 26 secured to the crank shaft. The links 20 each have at their ends pins 21 and 22, the pins 21 engaging in perforations 23 in the planet wheel 25 and the pins 22 engaging in slots 24 in the cam 14.

The planet wheel 25 is free to rotate upon the crank shaft 4 but it engages in an internally toothed ring 28 secured to the cylinder heads or to the crank case. This internally toothed ring is co-axial with the crank shaft 4.

The speed of rotation of the cam 14 relative to the crank shaft 4 is governed by the ratio of diameter of the planet wheel 25 to that of the ring 28 and depends upon the number of cylinders in the engine. Likewise the number of lobes 15 upon the cam depends upon the number of cylinders. Thus in an engine having seven cylinders as shown in the drawings, the speed of rotation of the cam must be one-sixth that of the crank shaft and the cam must have three lobes.

Referring to the lobes 15 of the cam 14 as

X, Y, and Z, and to the cylinders as A, B, C, D, E, F and G consecutively (not according to their firing order) each lobe 15 of the cam 14 operates the exhaust valve 1 and intake valve 2 of each cylinder in the following manner: Lobe X engages and lifts the exhaust valve of cylinder A for approximately half a revolution of the crank shaft. It then releases the exhaust valve, which is returned by its spring, and engages and lifts the intake valve of cylinder A for approximately the next half revolution of the crank shaft. It then releases the intake valve and it is returned by its spring.

During the above complete revolution of the crank shaft the cam has rotated through one-sixth revolution and for the next revolution of the crank shaft the valves of cylinder A are not operated as the lobes are spaced at one-third revolution of the cam.

Two-sevenths of a revolution after the above cycle of cylinder A had commenced, lobe Y commenced to operate the exhaust valve of cylinder C and the same cycle was carried out in this cylinder as was carried out in A excepting that the entire cycle was two-sevenths of a revolution of the crank shaft later.

When the crank had rotated through four-sevenths of a revolution lobe Z commenced to operate cylinder E and for each further two-sevenths of a revolution of the crank shaft a further cylinder commences the cycle, thus lobe A next operates cylinder G, lobe Y operates cylinder B, lobe Z operates cylinder D and lobe X operates cylinder F, after which lobe Y operates cylinder A and so on.

The revolution of the cam 14 is effected in impulses which are of such length and at such a period that the respective valves are rapidly lifted during an impulse, are held in their open position during the period between impulses and are dropped during the next impulse. This movement ensures quick opening and closing of the valves. In a seven cylinder engine as shown in the drawings there are twenty-one impulses during a complete revolution of the cam 14 and if Fig. 7 of the drawings is considered it will be obvious how the impulses are effected. In this figure the line K indicates the path of travel of the pins 21 which connect the one end of each link 20 to the planet wheel 25 while the line L indicates the path of travel of the pins 22 which connect the other end of each link 20 to the cam 14. It must be remembered that the pins 22 engage in the slots 24 as the distance between them constantly varies. The distances between the lines M indicate the rate of travel per unit of time of the pins 22 and show how they successively accelerate and then slow down.

Describing how the impulses are effected particularly with reference to Fig. 7 and Fig. 2 (in which the links are indicated in similar positions) it will be seen that, as the crank shaft 4 turns through one revolution, the eccentric 26 is carried around with it and the planet wheel 25, owing to it engaging in the toothed ring 28, is driven around in a direction of rotation opposite to that of the crank shaft and at a slower speed, it turning only through one-seventh revolution for one revolution of the crank shaft. The planet wheel, at the same time as it moves through the one-seventh revolution, moves eccentrically about the crank shaft, causing the pins 21 of the links 20 to move along a path as indicated by the curved lines K in Fig. 7, one revolution of the crank shaft 4 producing a length of movement of each pin 21 equal to the length of one curved line K. The pin 22 of each link moves concentrically about the crank shaft and as the pin 21 constantly changes its direction of travel relatively to the line L so the pin 21 (as the pin 22 moves along one path K) is at first stationary and then commences to move, and as it moves along the path K towards its centre it accelerates, slowing down or coming to rest, or as shown in Fig. 7 it moves slightly counter-directional, as it reaches the other end of the path K. As there are three links 20 equally spaced and there are seven curved paths K the maximum speeds of the three pins 22 occur at different (equally spaced) intervals and by making the slots 24 in the cam 14 of appropriate length the cam is rotated by impulses, an impulse occurring wherever the fastest moving pin 22 strikes the end of its slot 24.

The various parts are suitably lubricated and the planet wheel, cam and tappets preferably run in oil.

What I claim is:

1. A gearing arrangement to rotate the cam of engines having the cylinders arranged parallel or radial about the axis of the crank shaft, means comprising a fixed toothed ring coaxial with the crank shaft of the engine, a planet wheel in engagement with the ring, an eccentric secured upon the crank shaft carrying the planet wheel, and links each having at one end a pin engaging in a perforation in the planet wheel and each having at its other end a pin engaging in a slot in the cam, the links which connect the rotatable cam to the planet wheel being longer than the radius of the eccentric.

2. A gearing arrangement to rotate the cam of engines having the cylinders arranged parallel or radial about the axis of the crank shaft and having exhaust valves and intake valves, means comprising a fixed tooth ring coaxial with the crank shaft of the engine, a planet wheel in engagement with the ring, an eccentric secured upon the crank shaft carrying the planet wheel, and links each having at one end a pin engaging in a perforation in the planet wheel and each having at its other end a pin engaging in a slot in the cam, the effective length of the links being greater than the radius of the eccentric, and lobes upon the cam each operating in proper sequence both the intake and the exhaust valves of each cylinder.

3. Engines having the cylinders arranged parallel about the axis of the crank shaft, an improved valve gear comprising a fixed tooth ring coaxial with the crank shaft of the engine, a planet wheel in engagement with the ring, an eccentric secured upon the crank shaft carrying the planet wheel, links each having at one end a pin engaging in a perforation in the planet wheel and each having at its other end a pin engaging in a slot in the cam, the effective length of the links being greater than the radius of the eccentric, lobes upon the cam, and an exhaust valve and an intake valve for each cylinder, the valves being radially positioned and in one plane at right angles to the axis of the crank shaft, each valve being adapted to be operated in proper sequence by each lobe of the cam.

WILLIAM AUGUSTUS COOMBS.